United States Patent
Kato (10) Patent No.: US 12,441,322 B1
(45) Date of Patent: Oct. 14, 2025

(54) LOCK-UP CLUTCH CONTROLLER

(71) Applicant: SUBARU CORPORATION, Tokyo (JP)

(72) Inventor: Nobuhide Kato, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 19/190,886

(22) Filed: Apr. 28, 2025

(30) Foreign Application Priority Data

Jun. 4, 2024 (JP) .................. 2024-090730

(51) Int. Cl.
*B60W 30/188* (2012.01)
*B60W 10/02* (2006.01)
*B60W 10/06* (2006.01)

(52) U.S. Cl.
CPC ........ *B60W 30/188* (2013.01); *B60W 10/026* (2013.01); *B60W 10/06* (2013.01); *B60W 2510/0275* (2013.01); *B60W 2510/0283* (2013.01); *B60W 2510/0638* (2013.01); *B60W 2710/024* (2013.01); *B60W 2710/0666* (2013.01); *B60W 2710/0672* (2013.01)

(58) Field of Classification Search
CPC .. B60W 10/026; B60W 10/06; B60W 30/188; B60W 2510/0275; B60W 2510/0283; B60W 2510/0638; B60W 2710/024; B60W 2710/0666; B60W 2710/0672
See application file for complete search history.

(56) References Cited

U.S. PATENT DOCUMENTS

| | | | |
|---|---|---|---|
| 9,421,965 B2 * | 8/2016 | Yamazaki | B60W 20/10 |
| 2016/0137182 A1 * | 5/2016 | Johri | B60W 50/06 180/65.265 |
| 2017/0363204 A1 * | 12/2017 | Matsubara | F16D 48/06 |

FOREIGN PATENT DOCUMENTS

JP H09-112685 A 5/1997

* cited by examiner

*Primary Examiner* — Edwin A Young
(74) *Attorney, Agent, or Firm* — Rimon P.C.

(57) ABSTRACT

A lock-up clutch controller includes a lock-up clutch and one or more processors. The lock-up clutch is configured to directly couple an engine to an automatic transmission without via a torque converter interposed between the engine and the automatic transmission. The one or more processors are configured to control engagement and disengagement of the lock-up clutch. The one or more processors are configured to, in the middle of the engagement of the lock-up clutch, set a lower limit value of engine torque based on engagement torque of the lock-up clutch, and control the engine to inhibit the engine torque from falling below the lower limit value.

5 Claims, 4 Drawing Sheets

FIG. 1

MAP OF LIMITATION VALUE ON AMOUNT
OF DECREASE IN ENGINE TORQUE

|  | $|Te-Tl|$ (Nm) |
|---|---|
|  | ⇐ SMALL             LARGE ⇒ |
| $|Ne-Nt|$ (rpm)  ⇐ SMALL  ⇐ LARGE | ⇐ SMALL     ⇑ SMALL     LARGE ⇒<br>LIMITATION VALUE ON AMOUNT OF DECREASE IN ENGINE TORQUE<br>⇓ LARGE |

LOCK-UP CLUTCH CONTROLLER

CROSS REFERENCE TO RELATED APPLICATIONS

The present application claims priority from Japanese Patent Application No. 2024-090730 filed on Jun. 4, 2024, the entire contents of which are hereby incorporated by reference.

BACKGROUND

The disclosure relates to a lock-up clutch controller for a lock-up clutch configured to directly couple an engine and an automatic transmission without via a torque converter interposed between the engine and the automatic transmission.

Torque converters have been widely used in combination with a stepped automatic transmission (stepped AT), a continuously variable transmission (CVT), etc. mounted on a vehicle. Torque converters are configured to amplify engine torque, i.e., an engine driving force, using fluid such as oil. Torque converters are configured to transmit the engine torque by the oil and perform torque amplification, allowing for a smooth start of the vehicle. Moreover, torque converters are also configured to absorb vibration generated from the engine. Meanwhile, because torque converters are configured to transmit the engine torque by the oil, there occurs a transmission loss due to slippage. That is, transmission efficiency decreases.

To suppress such a decrease in the transmission efficiency by the torque converter and improve a fuel consumption ratio, i.e., fuel consumption, a lock-up mechanism, i.e., a lock-up clutch, has been widely adopted. The lock-up clutch is configured to directly couple an input, i.e., a crankshaft of an engine, to an output, i.e., an input shaft of a transmission, at a predetermined vehicle speed or higher. That is, at the start of the vehicle, the lock-up clutch is disengaged to allow the amplified engine torque to be inputted to the input shaft of the transmission via the torque converter. For example, on steady travel, the lock-up clutch is engaged to allow the engine torque to be directly inputted from the crankshaft of the engine to the input shaft of the transmission.

Inside the torque converter, a release chamber and an application chamber are provided, with a lock-up piston in between on which the lock-up clutch is provided. The release chamber is defined on front-cover side, and the application chamber is defined on pump-impeller side to be opposed to the release chamber. When the lock-up clutch is engaged, the oil flows from the application chamber to the release chamber to generate differential pressure between the application chamber and the release chamber, and the lock-up clutch is engaged by the differential pressure. When the lock-up clutch is disengaged, the oil flows from the release chamber to the application chamber to disengage the lock-up clutch. For example, reference is made to Japanese Unexamined Patent Application Publication (JP-A) No. H09-112685.

The engagement and the disengagement of the lock-up clutch is made by adjusting hydraulic pressure, i.e., lock-up clutch applied pressure, of the oil to be supplied to the lock-up clutch, i.e., the application chamber described above. For example, the hydraulic pressure of the oil to be supplied to the lock-up clutch is adjusted, or regulated, by, for example, a control unit, i.e., an electronic control unit, by varying a duty ratio of a voltage to be applied to a solenoid valve provided on an oil passage that communicates the application chamber and an oil pump.

SUMMARY

An aspect of the disclosure provides a lock-up clutch controller including a lock-up clutch and one or more processors. The lock-up clutch is configured to directly couple an engine to an automatic transmission without via a torque converter interposed between the engine and the automatic transmission. The one or more processors are configured to control engagement and disengagement of the lock-up clutch. The one or more processors are configured to, in the middle of the engagement of the lock-up clutch, set a lower limit value of engine torque based on engagement torque of the lock-up clutch, and control the engine to inhibit the engine torque from falling below the lower limit value.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

In the middle of engagement of a lock-up clutch, that is, while gradually increasing engagement torque, i.e., in a transition period of the engagement, when engine torque decreases because of, for example, a release of stepping down of an accelerator pedal, and the engine torque becomes smaller than the engagement torque of the lock-up clutch, there occurs possibility of sudden engagement of the lock-up clutch, causing a shock. At this occasion, lowering the engagement torque of the lock-up clutch causes possibility of a racing shock of the engine or sudden acceleration in accompaniment with the disengagement of the lock-up clutch.

It is desirable to provide a lock-up clutch controller that makes it possible to suppress a shock in the middle of engagement of a lock-up clutch, i.e., in a transition period of the engagement.

In the following, some example embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. In addition, elements that are not directly related to any embodiment of the disclosure are unillustrated in the drawings.

Figure 1:
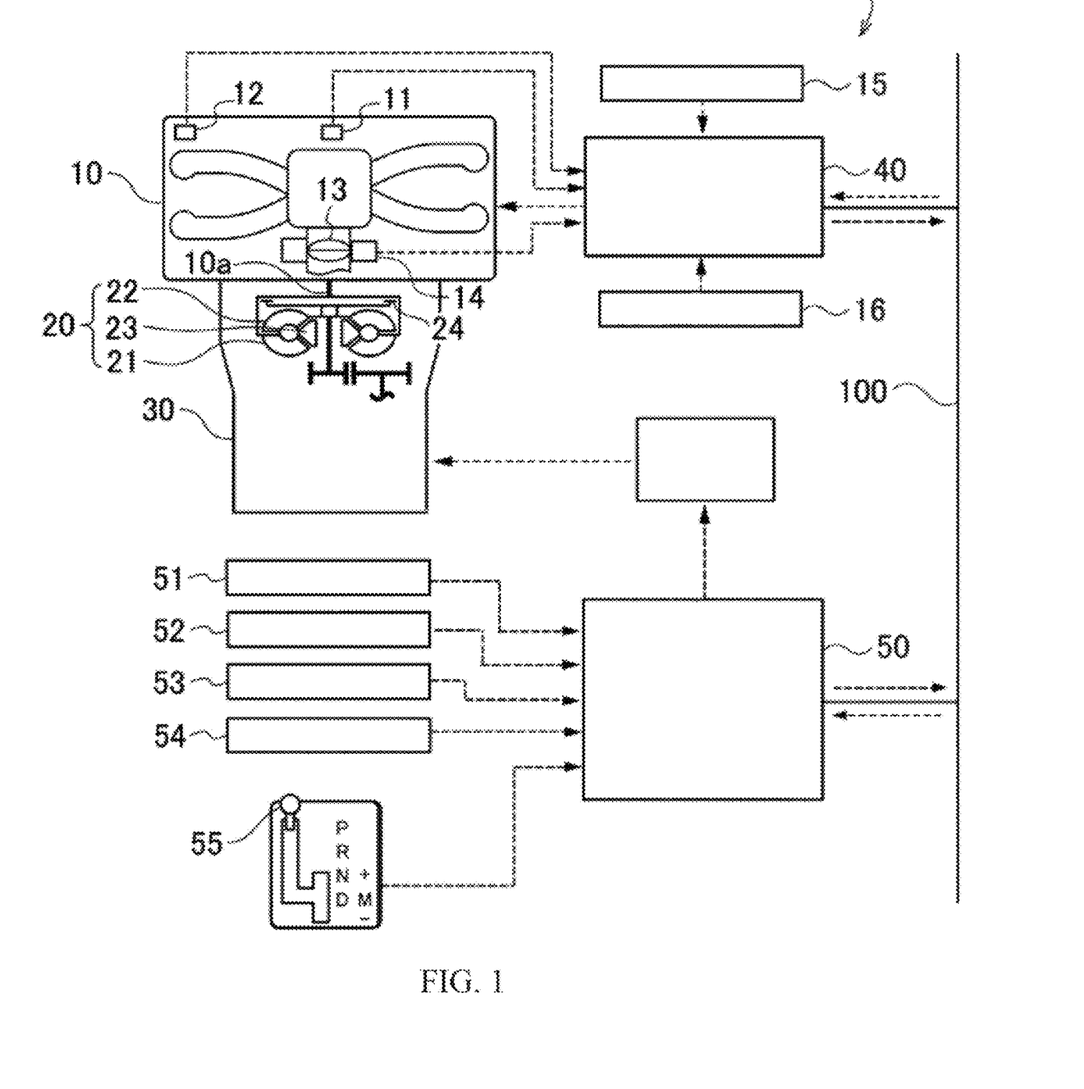
FIG. 1 is a block diagram of configurations of a lock-up clutch controller according to an embodiment, and a power unit to which the lock-up clutch controller is applied.

First, with reference to FIG. 1, description is given of a configuration of a lock-up clutch controller 1 according to an embodiment. FIG. 1 is a block diagram of configurations of the lock-up clutch controller 1 and a power unit to which the lock-up clutch controller 1 is applied.

An engine 10 may be of any kind. For example, the engine 10 may include a horizontally opposed direct injection four-cylinder gasoline engine. In the engine 10, intake air from an unillustrated air cleaner is throttled by an electronically controlled throttle valve (hereinafter, also simply referred to as a "throttle valve") 13 provided in an intake pipe, passes through an intake manifold, and is taken into cylinders provided in the engine 10. An amount of the intake air from the air cleaner is detected by an air flow meter 15. On the throttle valve 13, a throttle position sensor 14 is provided. The throttle position sensor 14 is configured to detect a throttle plate position of the throttle valve 13. To each cylinder, an injector is attached. The injector is configured to inject fuel. Moreover, to each cylinder, an ignition plug and a coil incorporating an igniter are attached. The ignition plug is configured to ignite an air-fuel mixture. The coil incorporating the igniter is configured to apply a high voltage to the ignition plug. In each cylinder of the engine 10, the air-fuel mixture of the intake air and the fuel injected by the injector is ignited by the ignition plug and undergo combustion. An exhaust gas after the combustion is discharged through an exhaust pipe.

In addition to the air flow meter 15 and the throttle position sensor 14 described above, a cam angle sensor 12 is attached to near a camshaft of the engine 10. The cam angle sensor 12 is configured to make cylinder discrimination of the engine 10. A crank angle sensor 11 is attached to near a crankshaft 10a of the engine 10. The crank angle sensor 11 is configured to detect a position of the crankshaft 10a. As the crank angle sensor 11, for example, an electromagnetic pickup sensor may be used. These sensors may be coupled to an engine control unit (hereinafter referred to as an "ECU") 40 described later. To the ECU 40, various sensors may be coupled. Non-limiting examples of the various sensors may include an accelerator pedal sensor 16 and a water temperature sensor. The accelerator pedal sensor 16 is configured to detect an amount of stepping down of an accelerator pedal, that is, a degree of opening of the accelerator pedal. The water temperature sensor is configured to detect a temperature of cooling water of the engine 10.

To the crankshaft 10a of the engine 10, an automatic transmission 30 is coupled through a torque converter 20. The automatic transmission 30 is configured to convert a driving force of the engine 10 and output the resultant driving force. The torque converter 20 may perform clutch operation and torque amplification.

The torque converter 20 may include, for example, a pump impeller 21, a turbine liner 22, and a stator 23. The pump impeller 21 is coupled to the crankshaft 10a of the engine 10 and is configured to generate a flow of oil. The turbine liner 22 is disposed opposite to the pump impeller 21 and is configured to receive a motive force of the engine 10 through the oil and drive an output shaft. The stator 23 is located between the pump impeller 21 and the turbine liner 22, and is configured to rectify an exhaust flow, or a return flow, from the turbine liner 22 and return the resultant flow to the pump impeller 21, to produce an effect of the torque amplification.

The torque converter 20 may further include a lock-up clutch 24. The lock-up clutch 24 is configured to directly couple an input and an output. The torque converter 20 is configured to, when the lock-up clutch 24 is disengaged, or in a non-lock-up state, perform the torque amplification of the driving force of the engine 10 and transmit the resultant driving force to the automatic transmission 30. The torque converter 20 is configured to, when the lock-up clutch 24 is engaged, or in a lock-up state, directly transmit the driving force of the engine 10 to the automatic transmission 30. That is, the lock-up clutch 24 is configured to directly couple the engine 10 and the automatic transmission 30 without via the torque converter 20 interposed between the engine 10 and the automatic transmission 30.

Here, the engagement and the disengagement of the lock-up clutch 24 are made by adjusting hydraulic pressure, i.e., lock-up clutch applied pressure, of the oil to be supplied to the lock-up clutch 24, i.e., an application chamber. The lock-up clutch applied pressure is controlled by a transmission control unit (hereinafter referred to as a "TCU") 50. In one example, the TCU 50 is configured to adjust, or regulate, the hydraulic pressure of the oil to be supplied to the lock-up clutch 24 by, for example, varying a duty ratio of a voltage to be applied to a solenoid valve provided on an oil passage that communicates the application chamber and an oil pump.

The automatic transmission 30 may include a stepped automatic transmission, i.e., a stepped AT. The stepped AT may include a transmission unit including a shifting gear train and a hydraulic mechanism, and is configured to perform automatic shifting by the hydraulic mechanism. As the automated transmission 30, for example, a continuously variable transmission (CVT), a DCT (Dual Clutch Transmission), or the like may be also used.

An output-shaft rotation sensor 51 is attached to near an output shaft of the automatic transmission 30. The output-shaft rotation sensor 51 is configured to detect a rotation speed of the output shaft of the automatic transmission 30. Moreover, to the automatic transmission 30, a range switch 52 is attached. The range switch 52 is coupled to a gear shift lever 55, i.e., a selection lever, to move in conjunction with the gear shift lever 55. The range switch 52 is configured to detect a selected position of the gear shift lever 55. The output-shaft rotation sensor 51, the range switch 52, and the like are coupled to the TCU 50.

Moreover, to the automatic transmission 30, an oil temperature sensor 53 is attached. The oil temperature sensor 53 is configured to detect a temperature of an automatic transmission fluid (ATF) of the automatic transmission 30. In the following, the temperature of the ATF is also simply referred to as an "oil temperature." As the oil temperature sensor 53, for example, a thermistor or the like may be used. The oil temperature sensor 53 is also coupled to the TCU 50.

A shifting control of the automatic transmission 30 may be made by the TCU 50. Moreover, as described above, the TCU 50 is configured to control the engagement and the disengagement of the lock-up clutch 24.

Here, the TCU 50 may be communicatably coupled to the ECU 40 or the like through a CAN (Controller Area Network) 100. The ECU 40 is configured to make a general control of the engine 10.

The ECU 40 may include, for example, a microprocessor, an EEPROM (Electrically Erasable and Programmable Read Only Memory), a RAM (Random Access Memory), a back-up RAM, and an input/output I/F (interface). The microprocessor may perform calculation. The EEPROM may hold, for example, programs that cause the microprocessor to carry out processing. The RAM may hold various kinds of data such as calculation results. Contents of storage of the back-up RAM may be retained by, for example, a battery. To the ECU 40, various sensors are coupled. Non-limiting examples of the various sensors may include the crank angle sensor 11, the cam angle sensor 12, the throttle position sensor 14, the air flow meter 15, and the accelerator pedal sensor 16 described above.

In the ECU 40, the cylinder discrimination may be made based on an output of the cam angle sensor 12, and an engine speed may be obtained based on changes in a rotational position of the crankshaft 10a detected by an output of the crank angle sensor 11. Moreover, in the ECU 40, various kinds of data may be acquired based on detection signals inputted from the various sensors described above. Non-limiting examples of the data to be acquired may include the amount of the intake air, the degree of opening of the accelerator pedal, an air-fuel ratio of the air-fuel mixture, and the water temperature. Based on the various kinds of data thus acquired, the ECU 40 is configured to make the general control of the engine 10 by controlling an amount of fuel injection, ignition timing, and various devices such as the throttle valve 13. Moreover, in the ECU 40, engine torque may be acquired based on, for example, the amount of the intake air and the engine speed.

The ECU 40 may transmit data such as the water temperature of the engine, i.e., the temperature of the cooling water, the engine torque, the engine speed, and the degree of opening of the accelerator pedal to the TCU 50 or the like through the CAN 100. The ECU 40 may receive a lower limit value of the engine torque, i.e., a request for lower limitation, or the like from the TCU 50 through the CAN 100. When the ECU 40 receives the lower limit value of the engine torque, i.e., the request for the lower limitation, the ECU 40 may limit, for example, closewise driving of the throttle valve 13, i.e., limit a decrease in the amount of the intake air. Thus, the ECU 40 may control the engine torque to inhibit the engine torque from falling below the lower limit value, as described later in detail.

As described above, to the TCU 50, the output-shaft rotation sensor 51, the range switch 52, the oil temperature sensor 53, and the like may be coupled. To the TCU 50, a turbine speed sensor 54 or the like may be also coupled. The turbine speed sensor 54 may detect a turbine speed of the torque converter 20.

Moreover, the TCU 50 may receive, through the CAN 100, the engine speed, the engine torque, the degree of opening of the accelerator pedal, and the like transmitted from the ECU 40. The TCU 50 may make the shifting control of the automatic transmission 30, the engagement and the disengagement of the lock-up clutch 24, and the like based on the various kinds of data acquired, e.g., the engine speed, the engine torque, the degree of opening of the accelerator pedal, the rotation speed of the output shaft, i.e., the vehicle speed, and a shift position of the gear shift lever 55, i.e., a state of the range switch 52.

In particular, the TCU 50 and the ECU 40 are configured to cooperate in suppressing the lock-up clutch 24 from getting a shock in the middle of the engagement, i.e., in a transition period of the engagement.

The TCU 50 may include, for example, a microprocessor, an EEPROM, a RAM, a backup RAM, and an input/output I/F. The microprocessor may perform calculation. The EEPROM may hold, for example, programs that cause the microprocessor to carry out processing. The RAM may hold various kinds of data such as calculation results. Contents of storage of the back-up RAM may be retained by a battery. In the TCU 50, the program held in the EEPROM or the like is executed by the microprocessor, to realize what is described in the forgoing.

The TCU 50 may start the engagement of the lock-up clutch 24 when a predetermined condition for the engagement of the lock-up clutch is established. The predetermined condition for the engagement of the lock-up clutch may include, for example, whether the vehicle speed is equal to or higher than a predetermined speed. At this occasion, the TCU 50 may set target engagement torque of the lock-up clutch 24 based on, for example, the engine torque, the engine speed, and the turbine speed of the torque converter 20, and gradually increase the engagement torque, i.e., the hydraulic pressure, in accordance with the target engagement torque. In one embodiment of the disclosure, the target engagement torque may serve as a "control target value of the engagement torque."

Moreover, in the middle of the engagement of the lock-up clutch 24, i.e., in the transition period in which the engagement torque is gradually increased, the TCU 50 may set the lower limit value of the engine torque based on the target engagement torque of the lock-up clutch 24, actual engagement torque, or the hydraulic pressure. In one example, the TCU 50 may set the lower limit value of the engine torque based on an absolute value $|Ne-Nt|$ of a deviation between the engine speed Ne and the turbine speed Nt of the torque converter 20 and an absolute value $|Te-Tl|$ of a deviation between the engine torque Te and the target engagement torque Tl of the lock-up clutch 24.

The TCU 50 may set the lower limit value of the engine torque to a larger value, as the absolute value $|Ne-Nt|$ of the deviation between the engine speed and the turbine speed becomes larger. The TCU 50 may set the lower limit value of the engine torque to a larger value, as the absolute value $|Te-Tl|$ of the deviation between the engine torque and the target engagement torque of the lock-up clutch 24 becomes larger.

That is, the TCU 50 may set the lower limit value of the engine torque to a smaller value, as the absolute value $|Ne-Nt|$ of the deviation between the engine speed and the turbine speed becomes smaller. The TCU 50 may set the lower limit value of the engine torque to a smaller value, as the absolute value $|Te-Tl|$ of the deviation between the engine torque and the target engagement torque of the lock-up clutch 24 becomes smaller.

At this occasion, first, the TCU 50 may set a limitation value on an amount of decrease in the engine torque, i.e., an allowable value for an amount of change, to a smaller value, as the absolute value $|Ne-Nt|$ of the deviation between the engine speed and the turbine speed becomes smaller. The TCU 50 may set the limitation value on the amount of decrease in the engine torque to a smaller value, as the absolute value $|Te-Tl|$ of the deviation between the engine torque and the target engagement torque of the lock-up clutch 24 becomes smaller. This contributes to suppression of changes in the engine torque. Next, the TCU 50 may set the lower limit value of the engine torque by subtracting, from real-time engine torque, the limitation value on the amount of decrease in the engine torque. The real-time engine torque is engine torque at the time of setting the limitation value on the amount of decrease.

Figure 2:
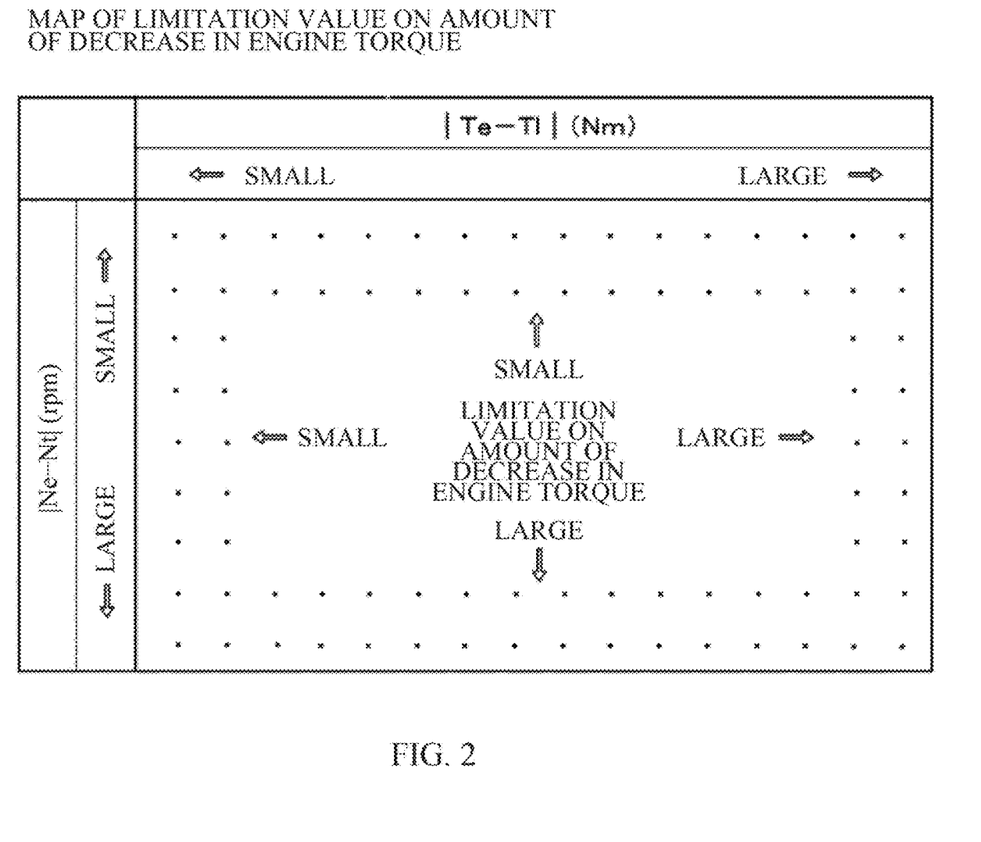
FIG. 2 illustrates an example of a map of a limitation value on an amount of decrease in engine torque, i.e., a map that defines relation between an absolute value of a deviation between an engine speed and a turbine speed of a torque converter, an absolute value of a deviation between engine torque and engagement torque of a lock-up clutch, and the limitation value on the amount of decrease in the engine torque.

Description is given here of a method of setting the limitation value on the amount of decrease in the engine torque. For example, the EEPROM of the TCU 50 may hold a map of the limitation value on the amount of decrease in the engine torque. The map defines relation between the absolute value of the deviation between the engine speed and the turbine speed, the absolute value of the deviation between the engine torque and the target engagement torque of the lock-up clutch 24, and the limitation value on the amount of decrease in the engine torque. The limitation value on the amount of decrease in the engine torque may be obtained by searching the map of the limitation value on the amount of decrease in the engine torque based on the absolute value of the deviation between the engine speed and the turbine speed, and the absolute value of the deviation between the engine torque and the target engagement torque of the lock-up clutch 24.

FIG. 2 illustrates an example of the map of the limitation value on the amount of decrease in the engine torque. In FIG. 2, the horizontal axis represents the absolute value (Nm) of the deviation between the engine torque and the target engagement torque of the lock-up clutch 24, and the vertical axis represents the absolute value (rpm) of the deviation between the engine speed and the turbine speed. In the map of the limitation value on the amount of decrease in the engine torque, the limitation value on the amount of decrease in the engine torque may be given for each combination, i.e., for each grid point, of the absolute value of the deviation between the engine speed and the turbine speed, and the absolute value of the deviation between the engine torque and the target engagement torque of the lock-up clutch 24. In the map of the limitation value on the amount of decrease in the engine torque, the limitation value on the amount of decrease in the engine torque may be set to a smaller value, as the absolute value of the deviation between the engine speed and the turbine speed becomes smaller. Moreover, the limitation value on the amount of decrease in the engine torque may be set to a smaller value, as the absolute value of the deviation between the engine torque and the target engagement torque of the lock-up clutch 24 becomes smaller.

The TCU 50 may request the ECU 40 to control the engine 10, or control the engine torque, to inhibit the engine torque from falling below, i.e., being smaller than, the set lower limit value. In other words, the TCU 50 may transmit the lower limit value of the engine torque, i.e., the request for the lower limitation, to the ECU 40 through the CAN 100.

Meanwhile, as described above, when the ECU 40 receives the lower limit value of the engine torque, i.e., the request for the lower limitation, from the TCU 50 through the CAN 100, the ECU 40 may limit, for example, the closewise driving of the throttle valve 13, i.e., limit the decrease in the amount of the intake air, to control the engine torque to inhibit the engine toque from falling below the lower limit value.

Figure 4:
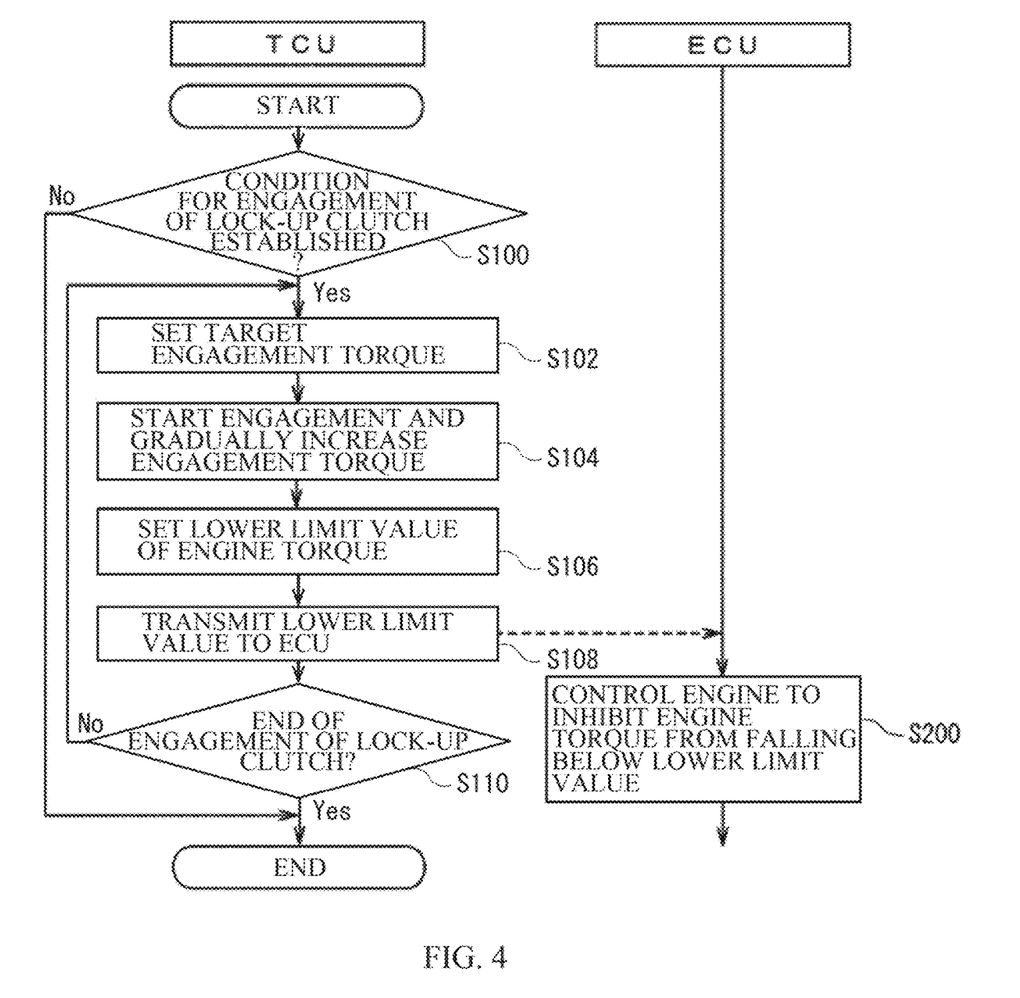
FIG. 4 is a flowchart of a processing procedure of lower limitation processing on the engine torque, i.e., engagement processing of the lock-up clutch, by the lock-up clutch controller according to the embodiment.

Description now moves on to the operation of the lock-up clutch controller 1 with reference to FIG. 4. FIG. 4 is a flowchart of a processing procedure of engagement processing of the lock-up clutch, i.e., lower limitation processing on the engine torque, by the lock-up clutch controller 1. The processing may be repeatedly carried out at predetermined timing in the TCU 50 and the ECU 40.

First, in step S100, a determination may be made as to whether the predetermined condition for the engagement of the lock-up clutch has been satisfied. For example, a determination may be made as to whether the vehicle speed is equal to or higher than the predetermined speed. When the predetermined condition for the engagement of the lock-up clutch has not been satisfied, the processing may end temporarily. When the predetermined condition for the engagement of the lock-up clutch has been satisfied, the processing may proceed to step S102.

In step S102, the target engagement torque of the lock-up clutch 24, i.e., the control target value of the engagement torque, may be set based on the engine torque, the engine speed, and the turbine speed.

Thereafter, in step S104, the actual engagement torque, i.e., the hydraulic pressure, may be gradually increased in accordance with the set target engagement torque of the lock-up clutch 24.

Thereafter, in step S106, the lower limit value of the engine torque may be set based on the absolute value |Ne−Nt| of the deviation between the engine speed Ne and the turbine speed Nt, and the absolute value |Te−Tl| of the deviation between the engine torque Te and the target engagement torque Tl of the lock-up clutch 24. It is to be noted that the method of setting the lower limit value of the engine torque is as described above, and detailed description thereof is omitted.

Thereafter, in step S108, the lower limit value of the engine torque, i.e., the request for the lower limitation, may be transmitted to the ECU 40 through the CAN 100. That is, the ECU 40 may be requested to control the engine 10 to inhibit the engine torque from falling below the lower limit value. Thereafter, the processing may proceed to step S110.

When the ECU 40 receives the lower limit value of the engine torque, i.e., the request for the lower limitation, from the TCU 50 through the CAN 100, the ECU 40 may limit, for example, the closewise driving of the throttle valve 13, i.e., limit the decrease in the amount of the intake air, and control the engine torque to inhibit the engine torque from falling below the lower limit value (step S200).

Meanwhile, in step S110, a determination may be made as to whether the engagement of the lock-up clutch 24 has finished. When the engagement of the lock-up clutch 24 has not finished, the processing may proceed to step S102, and the processing from step S102 described above may be repeated. When the engagement of the lock-up clutch 24 has finished, the processing may end temporarily.

Figure 3:
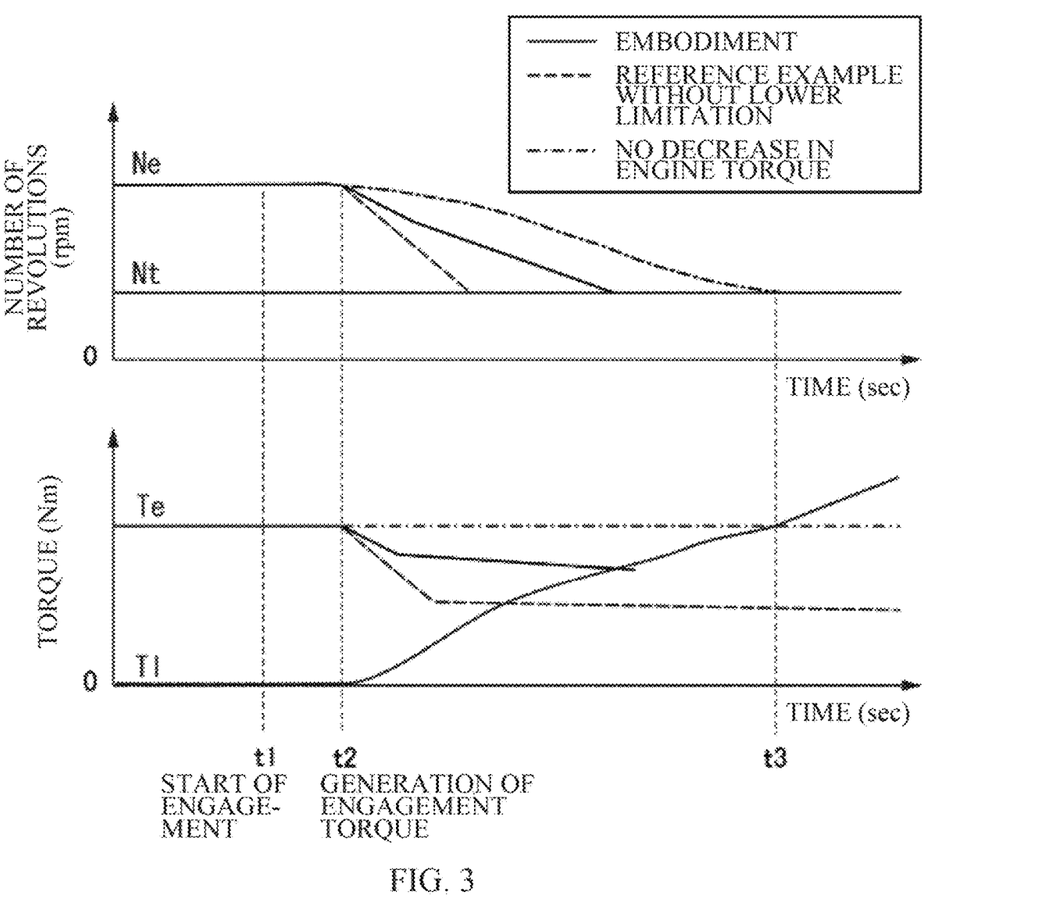
FIG. 3 is a timing chart of an example of changes in the engine speed, the turbine speed, the engine torque, and the engagement torque of the lock-up clutch, in the middle of engagement of the lock-up clutch.

FIG. 3 illustrates an example of changes in the engine speed Ne, the turbine speed Nt, the engine torque Te, and the engagement torque Tl of the lock-up clutch in the middle of the engagement of the lock-up clutch 24, i.e., in the transition period of the engagement. In FIG. 3, the horizontal axes represent time (sec), and the vertical axis in the upper portion represents the engine speed Ne and the turbine speed Nt. The vertical axis in the lower portion represents the engine torque Te and the target engagement torque Tl of the lock-up clutch 24. In FIG. 3, the changes according to the embodiment are indicated by a solid line, and the changes according to a reference example are indicated by a broken line. The reference example is a case without the lower limitation on the engine torque. FIG. 3 also illustrates changes in a case where no decrease in the engine torque occurs in the middle of the engagement are indicated by a long dashed short dashed line.

First, in the case where no decrease in the engine torque occurs in the middle of the engagement of the lock-up clutch 24, as indicated by the long dashed short dashed line, after a start of the engagement of the lock-up clutch 24, the engine speed gradually decreases as the engagement torque, i.e., the hydraulic pressure, gradually increases. This causes a gradual decrease in differential rotation between the engine speed and the turbine speed. The differential rotation eventually becomes zero. Thus, the lock-up clutch 24 is engaged gently, or smoothly.

In the reference example without the lower limitation on the engine torque, as indicated by the broken line, after the start of the engagement of the lock-up clutch 24, the engine torque falls at timing when the engagement torque of the lock-up clutch 24 is increased, and thereupon, the engine 10 and the automatic transmission 30 are suddenly engaged. This results in a shock due to inertia.

In the embodiment, as indicated by the solid line, even when the engine torque falls after the start of the engagement of the lock-up clutch 24, i.e., in the middle of the engagement, the engine torque is limited by the lower limit value of the engine torque. That is, the engine 10, or the engine torque, is controlled to inhibit the engine torque from falling below the lower limit value. This leads to suppression of the decrease in the engine torque, i.e., the engine speed, to avoid the sudden engagement of the lock-up clutch 24. As a result, the sudden engagement of the lock-up clutch 24 is avoided and the lock-up clutch 24 is protected against the shock.

As described above in detail, according to the embodiment, in the middle of the engagement of the lock-up clutch 24, the lower limit value of the engine torque is set based on the target engagement torque of the lock-up clutch 24. The engine 10 is controlled to inhibit the engine torque from falling below the lower limit value. This helps to avoid the sudden engagement of the lock-up clutch 24. Hence, it is possible to suppress the shock in the middle of the engagement of the lock-up clutch 24, i.e., in the transition period of the engagement.

In particular, according to the embodiment, the lower limit value of the engine torque may be set based on the deviation between the engine speed and the turbine speed, and the deviation between the engine torque and the engagement torque of the lock-up clutch. This helps to set the lower limit value of the engine torque more appropriately in consideration of changes in the inertia involved in the engagement of the lock-up clutch 24, that is, magnitude of the shock.

In one example, according to the embodiment, the lower limit value of the engine torque may be set to a smaller value, as the deviation between the engine speed and the turbine speed becomes smaller. The lower limit value of the engine torque may be set to a smaller value, as the deviation between the engine torque and the engagement torque of the lock-up clutch 24 becomes smaller. The lower limit value of the engine torque may be set by subtracting, from the real-time engine torque, the limitation value on the amount of decrease in the engine torque.

Thus, according to the embodiment, the lower limit value of the engine torque may be set to a larger value, as the deviation between the engine speed and the turbine speed becomes larger. The lower limit value of the engine torque may be set to a larger value, as the deviation between the engine torque and the engagement torque of the lock-up clutch 24 becomes larger. This helps to set the limitation value on the decrease in the engine torque, i.e., a relative value, to allow the changes in the inertia involved in the engagement of the lock-up clutch 24, i.e., the magnitude of the shock, to be smaller than a predetermined value, and helps to set the lower limit value of the engine torque, i.e., an absolute value, based on the limitation value on the amount of decrease in the engine torque.

Although some example embodiments of the disclosure have been described in the foregoing by way of example with reference to the accompanying drawings, the disclosure is by no means limited to the embodiments described above. It should be appreciated that modifications and alterations may be made by persons skilled in the art without departing from the scope as defined by the appended claims. The disclosure is intended to include such modifications and alterations in so far as they fall within the scope of the appended claims or the equivalents thereof.

For example, in the forgoing embodiment, a case is described in which the disclosure is applied to an engine vehicle. However, the disclosure is also applicable to, for example, any vehicle including a torque converter, e.g., a hybrid vehicle (HEV).

In the forgoing embodiment, the stepped automatic transmission (step AT) is used as the automatic transmission 30. However, the automatic transmission 30 may include, for example, a continuously variable transmission (CVT), a dual clutch transmission (DCT), or the like.

Further, the configuration of the lock-up clutch controller and the sharing of the operation of the ECUs are not limited to the forgoing embodiment. For example, the ECU 40 and the TCU 50 may be integrated.

The ECU 40 and the TCU 50 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the ECU 40 and the TCU 50. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the ECU 40 and the TCU 50 illustrated in FIG. 1.

The invention claimed is:

1. A lock-up clutch controller comprising:
   a lock-up clutch configured to directly couple an engine to an automatic transmission without via a torque converter interposed between the engine and the automatic transmission; and
   one or more processors configured to control engagement and disengagement of the lock-up clutch,
   the one or more processors being configured to, in a middle of the engagement of the lock-up clutch, set a lower limit value of engine torque based on engagement torque of the lock-up clutch, and control the engine to inhibit the engine torque from falling below the lower limit value.

2. The lock-up clutch controller according to claim 1, wherein
   the one or more processors are configured to set the lower limit value of the engine torque based on a deviation between an engine speed and a turbine speed of the torque converter, and a deviation between the engine torque and the engagement torque of the lock-up clutch.

3. The lock-up clutch controller according to claim 2, wherein the one or more processors are configured to, set the lower limit value of the engine torque to a larger value, as the deviation between the engine speed and the turbine speed becomes larger, and set the lower limit value of the engine torque to a larger value, as the deviation between the engine torque and the engagement torque of the lock-up clutch becomes larger.

4. The lock-up clutch controller according to claim 3, wherein the one or more processors are configured to set a limitation value on an amount of decrease in the engine torque to a smaller value, as the deviation between the engine speed and the turbine speed becomes smaller, set the limitation value on the amount of decrease in the engine torque to a smaller value, as the deviation between the engine torque and the engagement torque of the lock-up clutch becomes smaller, and set the lower limit value of the engine torque by subtracting, from real-time engine torque, the limitation value on the amount of decrease in the engine torque.

5. The lock-up clutch controller according to claim 4, wherein the one or more processors are configured to set a control target value of the engagement torque of the lock-up clutch based on the engine torque, the engine speed, and the turbine speed.

* * * * *